United States Patent [19]
Reznikov et al.

[11] Patent Number: 5,638,697
[45] Date of Patent: Jun. 17, 1997

[54] METHOD OF AND APPARATUS FOR COOLING FOOD PRODUCTS

[76] Inventors: Lev Reznikov, 1510 Ocean Parkway, # A17, Brooklyn, N.Y. 11230; Zachary Schulman, 30 Spring Meadow Rd., Mount Kisco, N.Y. 10536

[21] Appl. No.: 562,384

[22] Filed: Nov. 24, 1995

[51] Int. Cl.[6] .................................................. F25B 3/00
[52] U.S. Cl. .................................................. 62/603; 62/384
[58] Field of Search .............................. 62/603, 384, 388

[56] References Cited

U.S. PATENT DOCUMENTS

| | | | |
|---|---|---|---|
| 1,735,094 | 11/1929 | Slate | 62/603 |
| 4,137,723 | 2/1979 | Tyree, Jr. | 62/384 |
| 4,704,876 | 11/1987 | Hill | 62/388 |

*Primary Examiner*—Ronald C. Capossela
*Attorney, Agent, or Firm*—Ilya Zborovsky

[57] ABSTRACT

For cooling food products liquid carbon dioxide is supplied to a container for storing the food products and discharged in the interior of the container to form snow which covers the food products, while carbon dioxide vapors generated during the discharge are moved in the vicinity of the supplied liquid carbon dioxide so that the cold of carbon dioxide vapors is transferred to liquid carbon dioxide.

17 Claims, 9 Drawing Sheets

000001
METHOD OF AND APPARATUS FOR COOLING FOOD PRODUCTS

BACKGROUND OF THE INVENTION

The present invention relates to a method of and an apparatus for cooling food products for example in rail cars, containers, vessels, trucks, etc.

It is well known to cool food products with carbon dioxide. In known methods and apparatuses liquid carbon dioxide is supplied into the interior of a container and discharged through a plurality of nozzles so that the liquid carbon dioxide is chilled and forms snow which covers food products accommodated in the container. While the existing methods and apparatuses perform their intended functions in satisfactory manner, it is always desirable to reduce energy consumption and to increase efficiency of the method and the system so as to either produce the same amount of snow with lower liquid carbon dioxide consumption, or with the same liquid carbon dioxide supply produce more snow.

SUMMARY OF THE INVENTION

Accordingly, it is an object of the present invention to provide a method of and an apparatus for cooling food products, which is a further improvement of the existing methods and apparatuses.

In keeping with these objects and with others which will become apparent hereinafter, one feature of the present invention resides, briefly stated, in a method of cooling food products, which has the steps of providing a container for accommodating food products, supplying a liquid carbon dioxide and discharging it in an interior of said container so as to form snow in the interior of the container, with simultaneous generation of carbon dioxide vapors, and moving the carbon dioxide vapors relative to the supplied liquid carbon dioxide so that cold of the carbon dioxide vapors is transferred to the supplied liquid carbon dioxide.

It is also an object of the present invention to provide an apparatus for cooling food products, which comprises a container for accommodating cooled products, means for supplying liquid carbon dioxide into the container, means for discharging liquid carbon dioxide in the container so as to produce carbon dioxide snow with simultaneous generation of carbon dioxide vapors, and means for moving carbon dioxide vapors in the vicinity of the supplying means so that cold of carbon dioxide vapors is transferred to the supplied liquid carbon dioxide.

When the method is performed and the apparatus is designed in accordance with the present invention, the energy consumption for producing of carbon dioxide snow to cool the products is reduced and the quantity of the snow produced with the inventive solution is increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
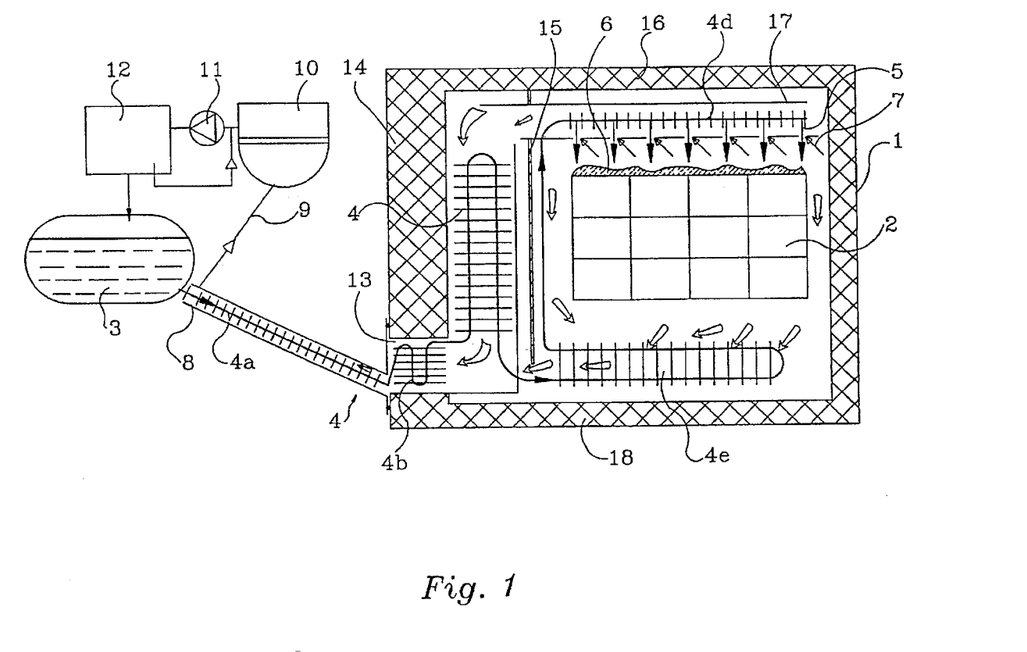
FIG. 1 is a schematic view showing the new apparatus for cooling food products.

An apparatus in accordance with the present invention has a heat insulated storage container which is identified with reference numeral 1 and utilized for storing food products 2 in a refrigerated condition for stationary storage or for transportation. The apparatus has an isothermal tank 3 with liquid carbon dioxide. The liquid carbon dioxide is supplied through a meandering line 4 into the inner space of the container 1 and discharged into the interior of the container through a plurality of nozzles 5 so as to form carbon dioxide snow 6 which covers the food product 2 and to keep it refrigerated. At the same time, carbon dioxide vapors are formed in the interior of the container 1.

In accordance with the present invention, the carbon dioxide vapors identified with reference numeral 7 are directed so as to bring them into contact with the supply line 4 for supplying liquid carbon dioxide so that the cold of the carbon dioxide vapors is utilized for cooling the liquid carbon dioxide.

FIG. 1 shows several embodiments of an element which provides the utilization of cold of evacuating carbon dioxide vapors for overcooling of the supplied liquid carbon dioxide. One of such elements is arranged in the region between the tank 3 and the inner opening of the container 1. It has an outer tube 8, and a portion 4a of the liquid carbon dioxide supply line located in the outer tube 8 and preferably provided with a plurality of ribs. The liquid carbon dioxide is supplied from a tank 1 toward the container in the interior of the portion 4a of the supply line 4, while carbon dioxide vapors are supplied in an opposite direction from the container 1 inside the pipe 8 over the portion 4a of the liquid carbon dioxide supply line. Then the carbon dioxide vapors are withdrawn through a line 9 into a gas vessel 10 and supplied by a compressor 11 into a liquefying vessel 12 in which they are liquefied and the liquid carbon dioxide is supplied to the tank 3.

Another heat exchanging element is formed in an inlet opening of the container 1. In particular, a finned portion 4b of the liquid carbon dioxide supply line 4 is located inside the inlet opening 13 and supplies the liquid carbon dioxide into the container while the carbon dioxide vapors 7 pass in an opposite direction between an inner wall of the inlet opening 13 and the outer surface of the portion 4b to thereafter flow into the pipe 8 again. A further heat exchanging element is formed in a space between a side wall 14 of the container 1 and a partition 15 of the inner space of the container. Liquid carbon dioxide passes through a finned portion 4c of the liquid carbon dioxide supply line 4, while carbon dioxide vapors flow in the space between the portion 4b on the one hand, and the side wall 14 and the partition 15 of the container 1 on the other hand, to further flow through the opening 13 into the pipe 8.

Still another heat exchanging element is formed in the area which is close to a ceiling 16 of the container 1. Liquid carbon dioxide flows through a portion 4d of the liquid carbon dioxide supply line 4 while carbon dioxide vapors 7 flow into a pipe 17 which surrounds the portion 4d and further through the pipe 17 in the opposite direction. Finally, the heat exchanging element can be also located in the area of a floor 17 of the container 1. Here again the liquid carbon dioxide flows through a portion 4e of the liquid carbon dioxide supply line 4, while the carbon dioxide vapors flow around the portion 4a in an opposite direction in the region of the floor 17, preferably through beams arranged on the floor. It is to be understood that in all embodiment of the heat exchanging elements which include the portions 4a 4b, 4c, 4d, 4e of the liquid carbon dioxide supply line, the carbon dioxide vapors are preferably evacuated from the container 1 and then liquefied so that the liquid carbon dioxide is supplied again into the tank 3. It is also to be understood that it is not necessary to provide the heat exchanging elements associated with all portions 4a, 4b, 4c, 4d, 4e. It is possible to provide in the inventive apparatus only one or more heat exchanging elements from those shown in the drawings and described hereinabove. Movement of the carbon dioxide vapor flow is provided due to pressure difference generated inside the container 1 during conversion of the liquid carbon dioxide due to its throttling with high pressure inside the container. The flow of the carbon dioxide vapors also carries snow flakes which additionally cool the supplied liquid carbon dioxide.

Figure 2:
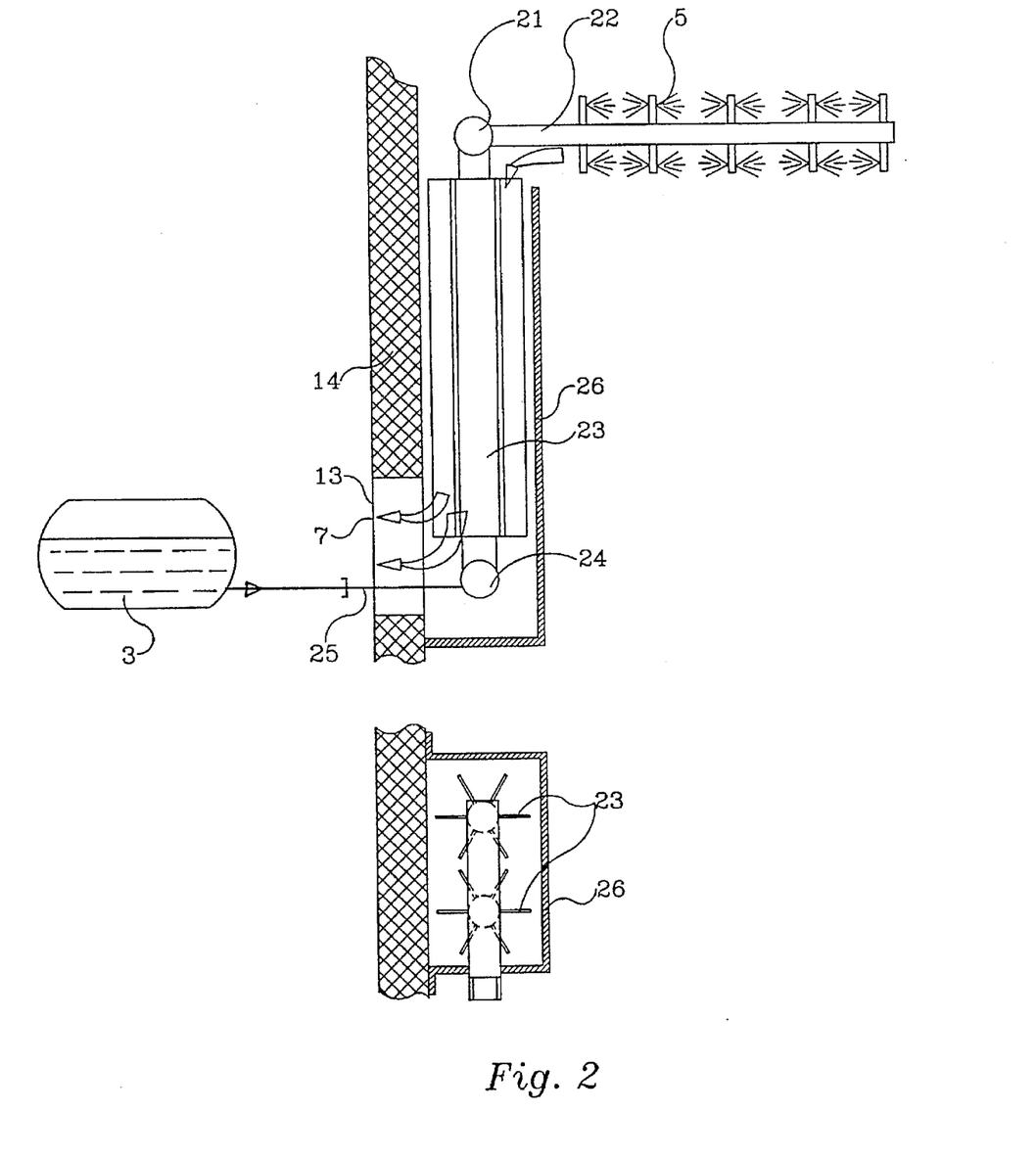
FIG. 2 and is a side view showing an element in which cold of carbon dioxide vapors produced during formation of snow is utilized for cooling the supply of the liquid carbon dioxide, in accordance with the present invention.

FIG. 2 shows one of the heat exchanging elements in accordance with the present invention. It has an upper collector 21 connected with a dispensing portion 22 of the liquid carbon dioxide supply line provided with a plurality of nozzles. A plurality of extruded ribbed tubes 23 connect the upper collector 21 with the lower connector 22, which in turn is connected with an inlet portion 25 of liquid carbon dioxide supply line 4. A casing 26 surrounds the extrusion pipes 23 and is mounted on the wall 14 of the container 1. The upper end of the casing 26 is open into the interior of the container 1, while the lower end of the casing is open into the inlet opening 13 of the container. The carbon dioxide vapors flow through the inner space of the casing to cool the supplied liquid carbon dioxide and then leave the container through the opening 13. The carbon dioxide vapors and the liquid carbon dioxide moving in opposite directions provide for conditions for efficient cooling of liquid carbon dioxide by carbon dioxide vapors.

Figure 3:
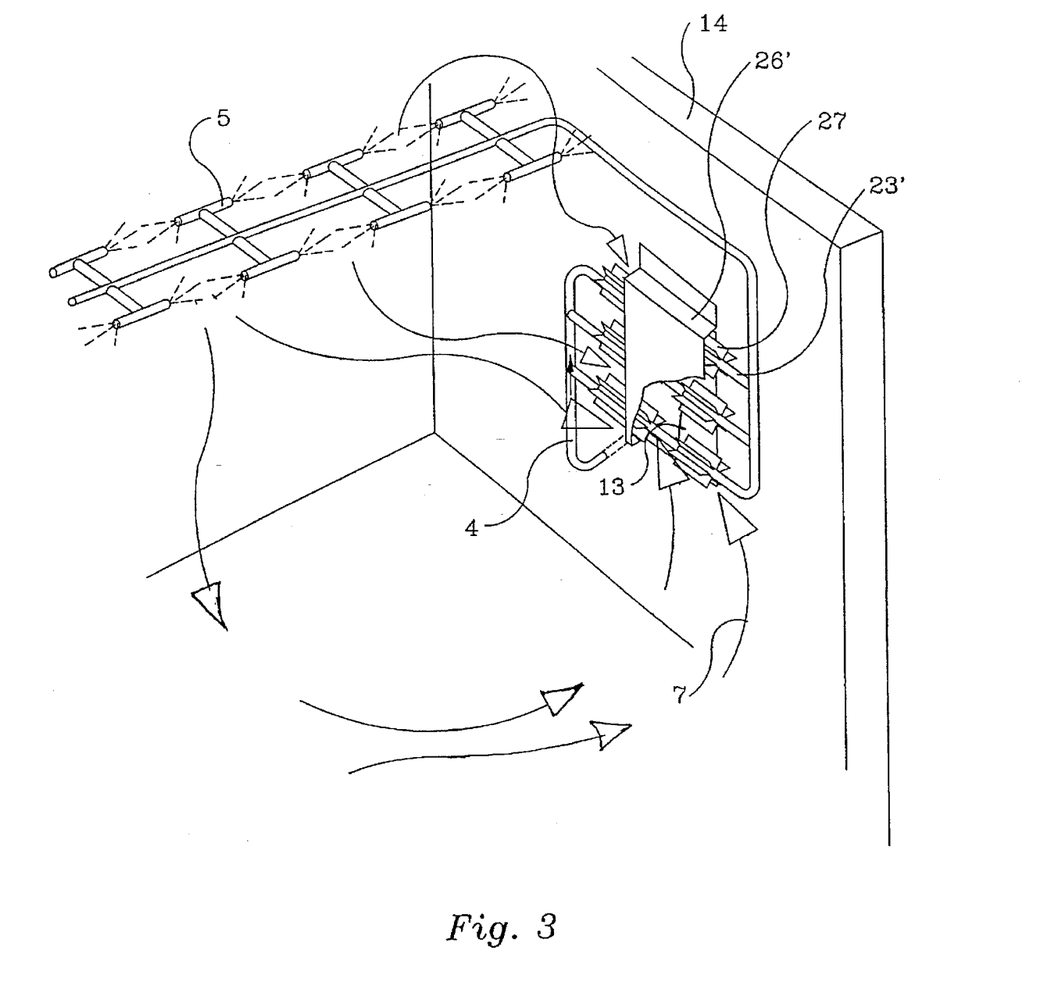
FIG. 3 is a view showing a further modification of the element of FIG. 2.

In the embodiment of FIG. 3, in contrast to the embodiment of FIG. 2, the casing 26' is connected with the opening 13 in the wall 14 of the container 1 through a middle part. Both ends of the casing 26' are open into the interior of the container 1. Fins 27 of the extrusion pipes 23' can be interrupted in the area of their connection to the opening 13 for improved distribution of vapors between the fins. The carbon dioxide vapor flow in this embodiment enters the heat exchanging element through both ends of the casing 26', and corresponding halves of the full flow move toward each other to the center of the element, and after uniting in the center leave through the opening 13 again with a full flow rate. Such a path provides the lowest hydraulic pressure resistance to the vapor flow, and therefore the lowest level of redundant pressure in the space of the container 1 during charging. Another advantage of this embodiment is that the opposite direction of speed vectors of the vapor flow halves in the heat exchanging element helps to separate the snow flakes from the vapor flow due to sharp changes of the speed so that precipitation is facilitated after colliding of the vapor streams.

Figure 4A:
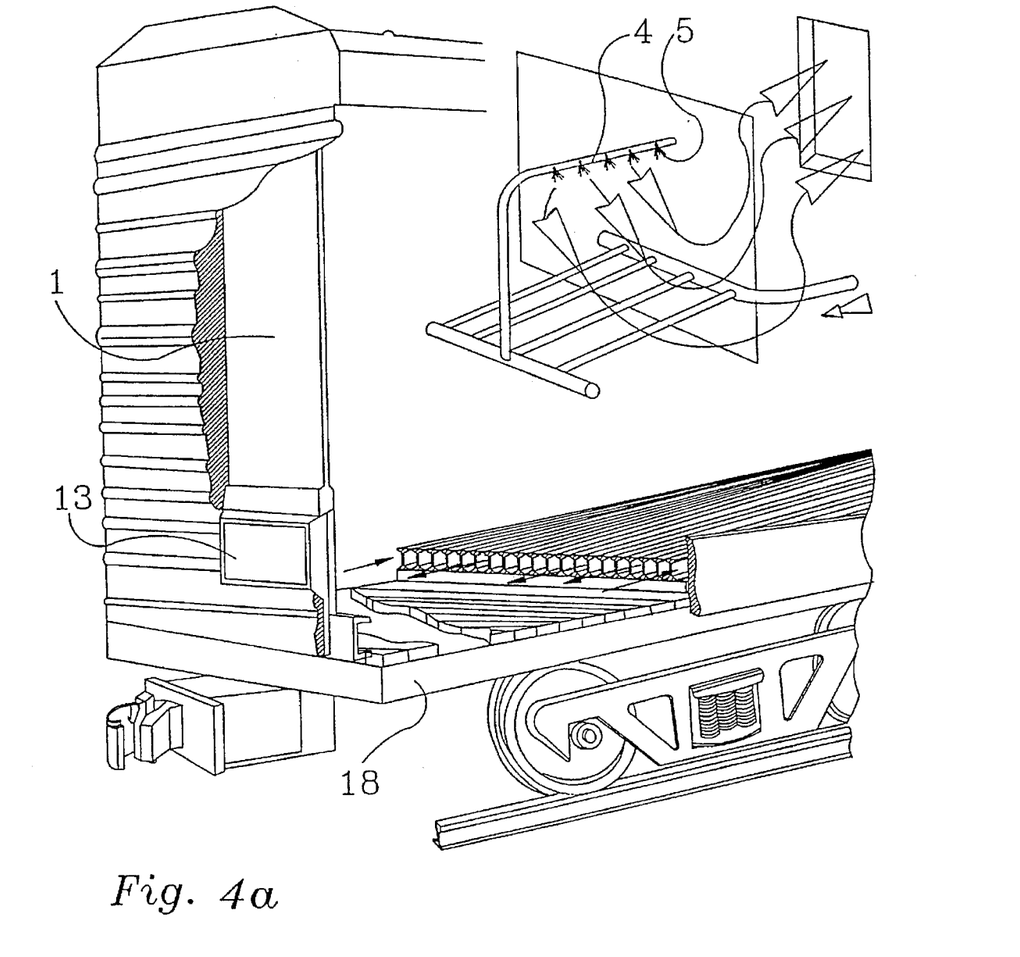
FIGS. 4a and 4b are perspective views of a container with the above mentioned element and the element itself in accordance with a further modification of the present invention.
Figure 4B:
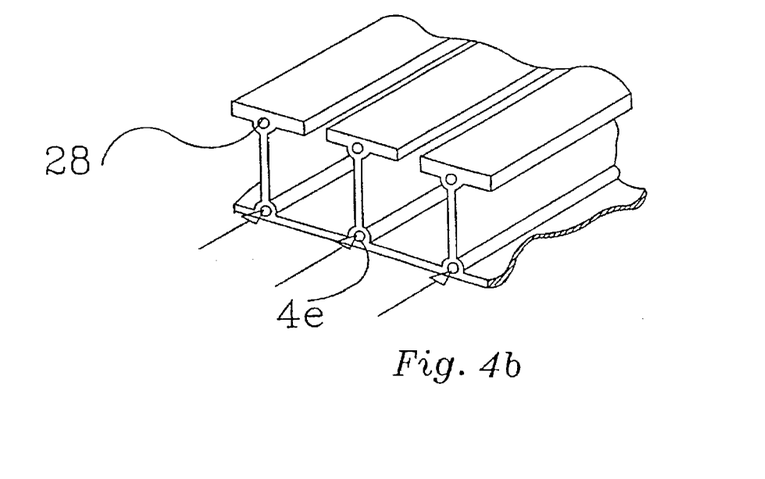

FIGS. 4a and 4b show a food container with the floor 18 provided with a plurality of extruded T-beam elements. As can be seen from the drawings, the T-beams are provided with a plurality of passages 28 which form a portion 4e of the liquid carbon dioxide supply line. Liquid carbon dioxide is supplied through the passages 28 at high pressure. It is to be understood that liquid carbon dioxide is supplied into the passages 28 from another portion of the liquid carbon dioxide supply line 4. Carbon dioxide vapors flow between the T-beams in an opposite direction so as to provide additional cooling of the liquid carbon dioxide. In this embodiment not only the cold of the carbon dioxide vapors is utilized for cooling the liquid carbon dioxide, but also the T-beam shaped floor is cooled so as to provide cooling of the food product from below, which in many instances constitutes a substantial problem.

Figure 5A:
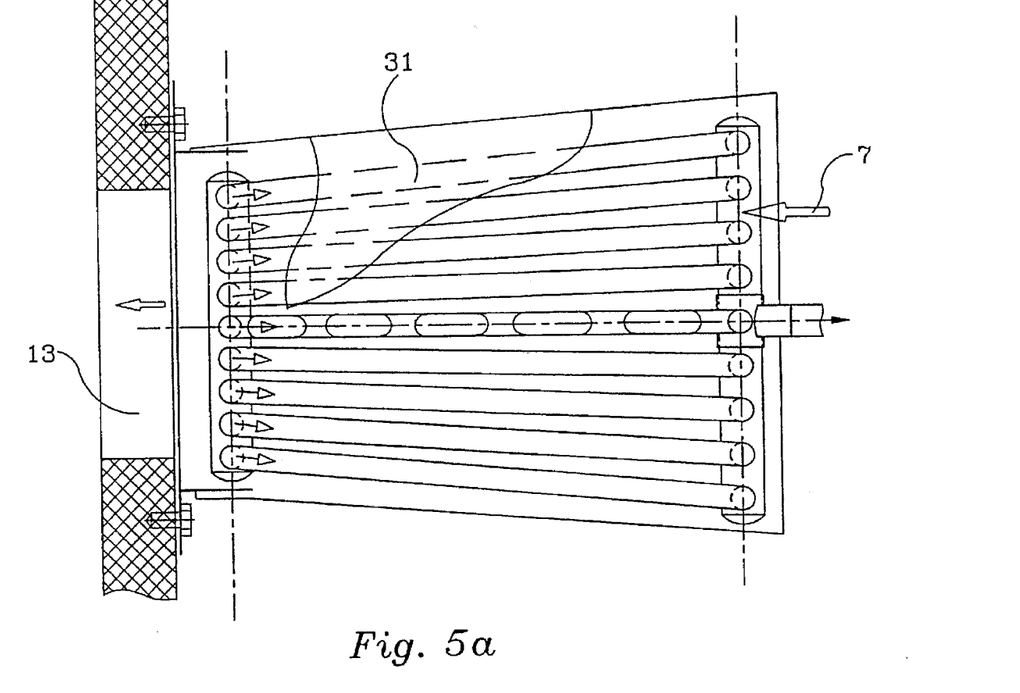
FIGS. 5a and 5b are views showing a heat exchange element.
Figure 5B:
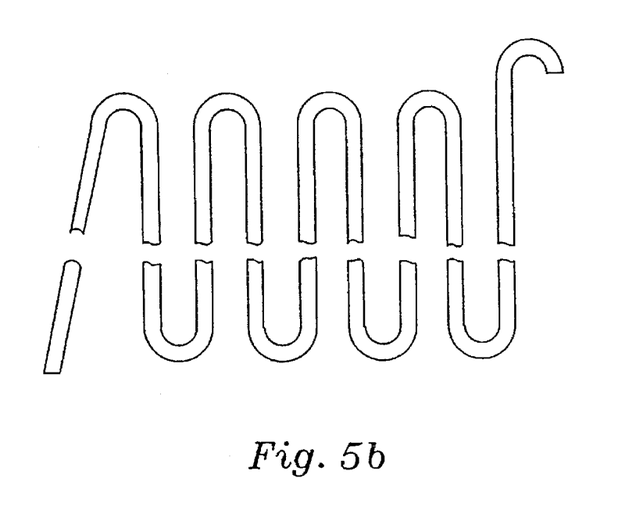

FIGS. 5a and 5b show a further modification of a heat exchanging element with which the supplied liquid carbon dioxide is cooled by carbon dioxide vapors. The heat exchanging element has bent plain or finned tubes 31 which form flat coil panels 32, which are connected with collectors 33 and 34. The collector 33 is arranged near the opening 13 of the container 1. The package of the coils-panels is placed in a casing 35. The coils are connected to the collectors at different distances. Therefore the distance between the panels increases from the opening in the wall toward a free section which is open into the interior of the container. The cross-section of the vapor flow reduces while moving from the container between the coil panels toward the opening, and at the same time the speed and heat transfer intensity increases. Such a design of the heat exchanging element and flow speed provide the maximum efficiency of the heat transfer with the lowest specific hydraulic resistance to the vapor flow. In the shown embodiment reference numeral 36 identifies a feeding pipe, reference numeral 37 identifies a pipe connector to a dispensing pipe with nozzles and reference numeral 38 identifies a frame of the package of coils.

Figure 6A:
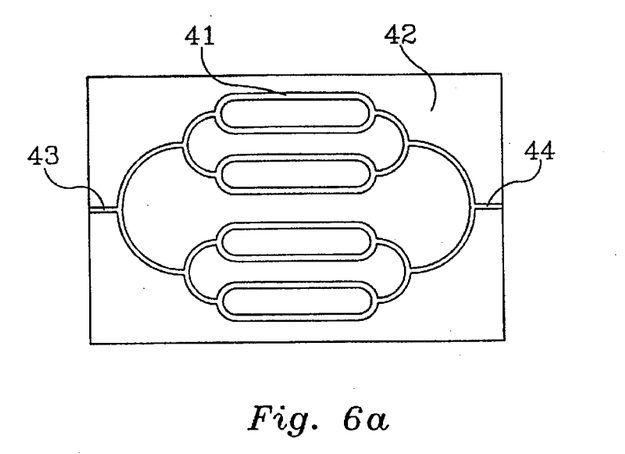
FIGS. 6a, 6b and 6c are a plan view, a side view and a fragment of another modification of the inventive element.
Figure 6B:
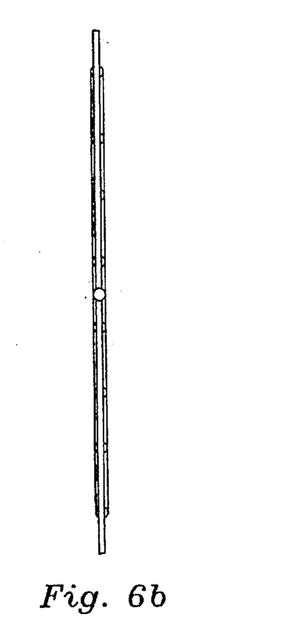
Figure 6C:
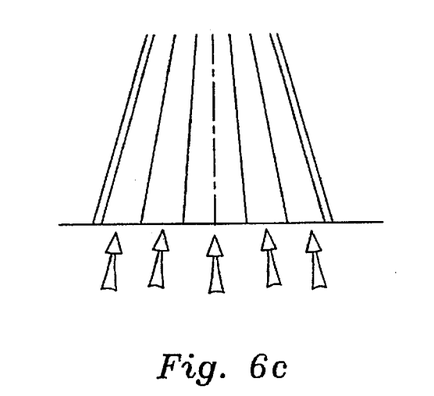

The heat exchanging element shown in FIGS. 6a-6c is designed substantially similarly, but is based on solid coil-panels which are formed as hollow, stamped elements and then welded metal sheets. Each heat exchanging element has a plurality of tubular channels identified with 41 connected with one another by a metal sheet support. The channels 41 communicate with one another and ultimately with an inlet tube 43 and an outlet tube 44.

Figure 7A:
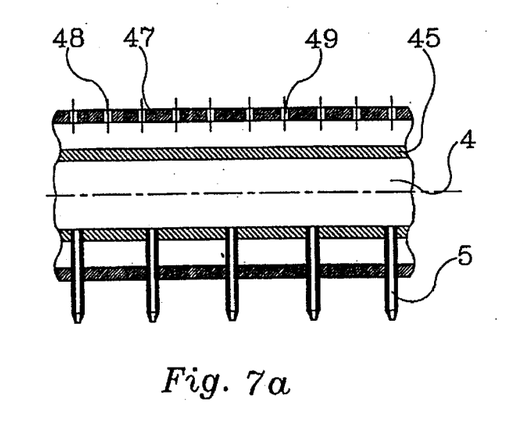
FIGS. 7a and 7b are an end view and a side view of a distribution line with nozzles for discharging liquid carbon dioxide, provided with the inventive element.
Figure 7B:
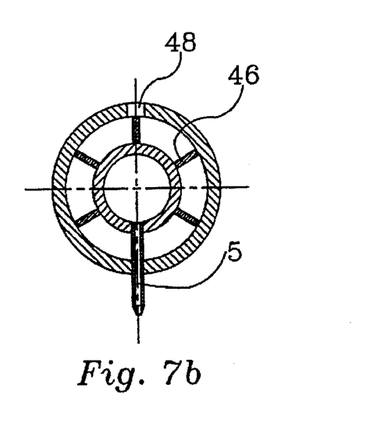

FIG. 7 shows a distribution part of the liquid carbon dioxide supply line 4. It has an internal tube 45 through which liquid carbon dioxide flows. The interior of the internal tube 45 communicates with the interior of relative nozzles 5. The internal tube 45 is provided with a plurality of longitudinal fins 46 which simultaneously form spacers. The internal tube 45 with the fins 46 is surrounded by external tube 47. The external tube 47 is provided with a plurality of perforations 48. During the operation liquid carbon dioxide is supplied through the interior of the internal tube 45 and is throttled through the nozzles 5 into the interior of the container, it undergoes conversion, dry ice precipitates in the container, while carbon dioxide vapors pass through the perforations 48 into a low pressure passage 49 formed between the interior tube 45 and the exterior tube 47.

Figure 8A:
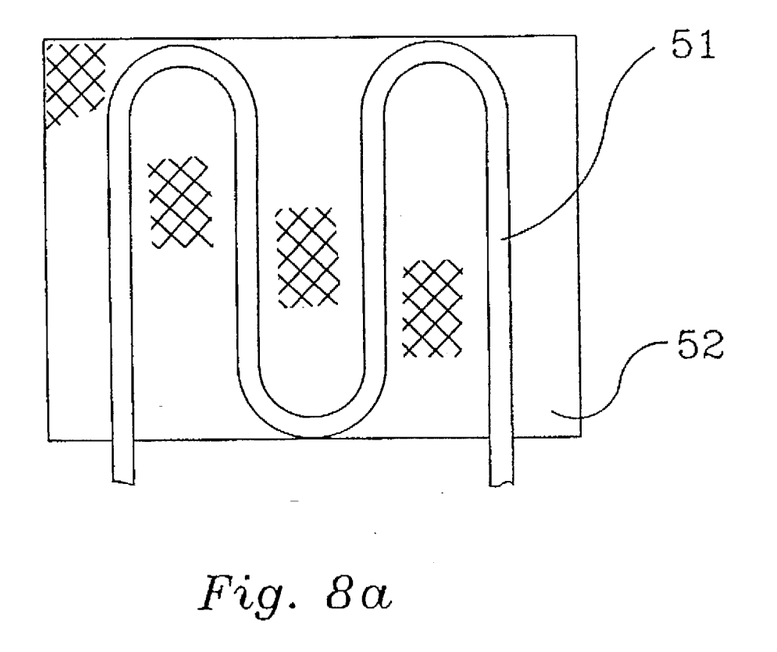
FIGS. 8a and 8b are a front view and a side view of the inventive element which simultaneously separates snow flakes.
Figure 8B:
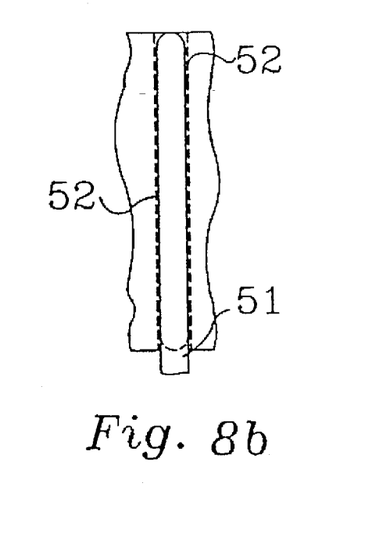

In accordance with a further feature of the inventive apparatus, snow flakes produced during the operation are filtered from carbon dioxide vapors which are utilized for additional cooling of the supplied carbon dioxide. As shown in FIGS. 8a, 8b the heat exchanging element shown here has a pipe 51 for supplying liquid carbon dioxide, which is finned with a metal wire net or mesh 52. In installed position, the net or mesh 52 is arranged transversely to the flow of carbon dioxide vapors. The net or mesh 52 is formed so that it is permeable for carbon dioxide vapors, but snow flakes or carbon dioxide are retained and precipitate on the net or mesh. Such a heat exchanging element can be installed for example in the inlet opening 13 of the container so that the net or mesh 52 closes the inlet opening.

Figure 9A:
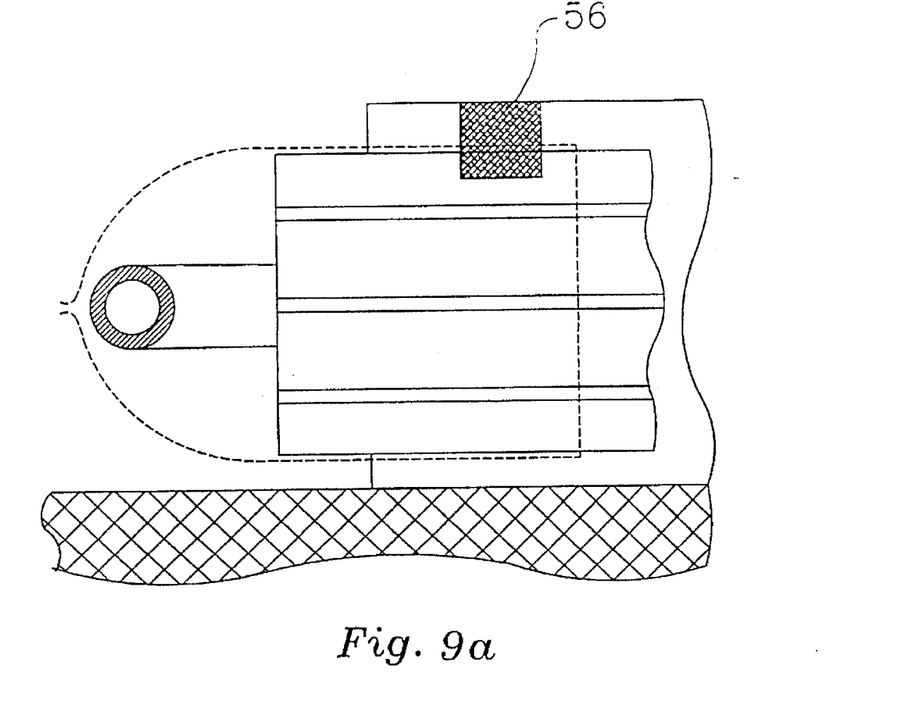
FIGS. 9a and 9b are a side view and an end view of another modification of the inventive element with separation of snow flakes.
Figure 9B:
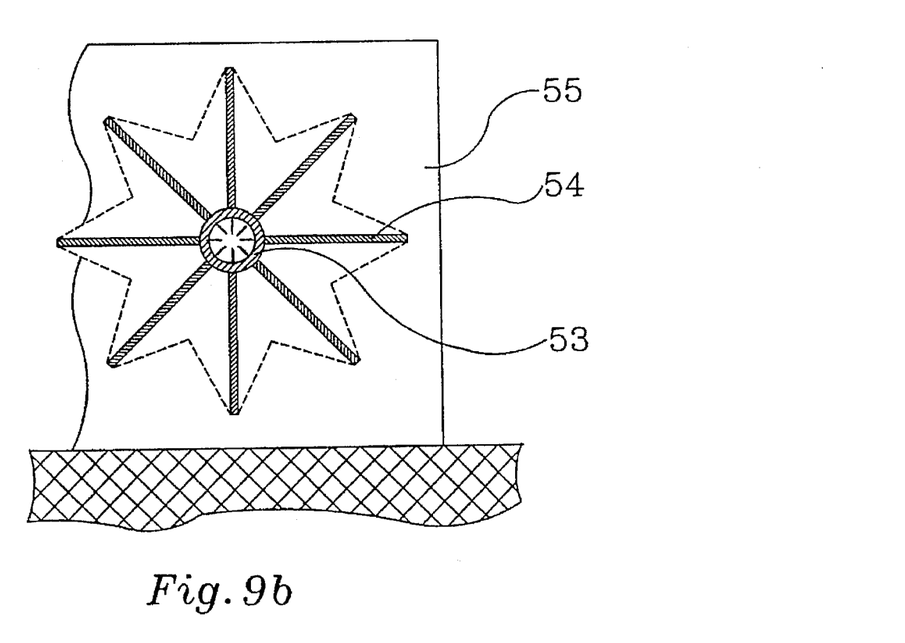

In accordance with another embodiment shown in FIGS. 9a, 9b the heat exchanging element has a pipe 53 with a plurality of longitudinally extending fins 54 arranged in a star-like manner. It is arranged in a casing 55. Wire nets 56 are soldered or welded to support edges of the fins 54 to provide a reliable mechanical connection and low contact thermal resistance of the connection between supporting elements and main filtering elements. The heat exchanging element can also be provided with an elastic sealant 56 of the vapor flow.

Figure 10:
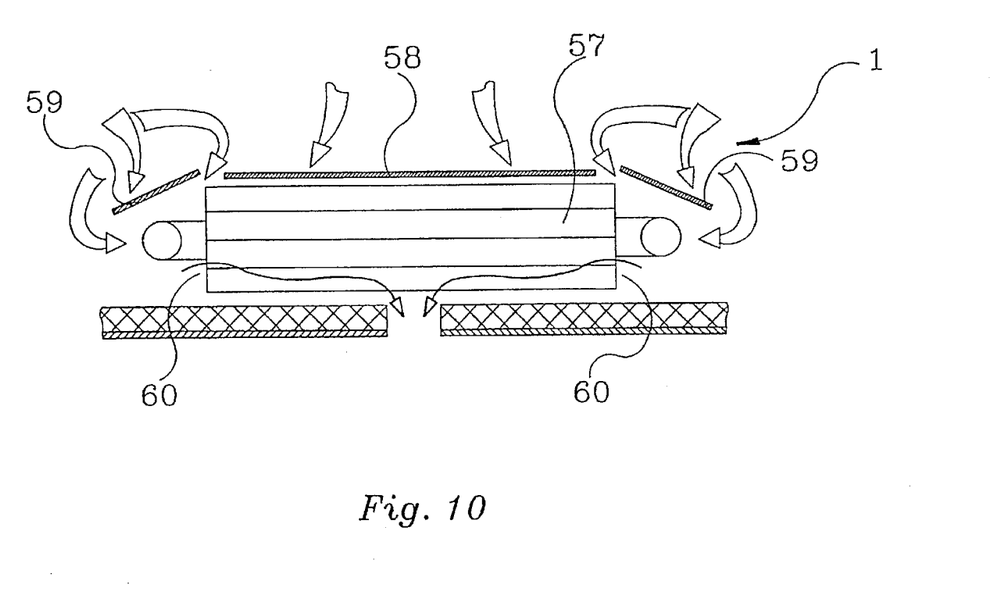
FIG. 10 shows an additional modification of the element provided with separation of snow flakes.

FIG. 10 shows another heat exchanging element with separation of snow flakes from the vapor stream. Heat exchanging elements 57 are arranged in a casing 58 which is open at both ends to the vapor flow. Screens-deflectors of the vapor flow 59 are installed on the opening 60 in the casing 58 to separate parts of dry ice which moves with a high speed with the vapor stream, carrying out the snow flakes. Sharp change of the direction of stream speed vector provides effective separation of solid particles having high density from the stream. The best effect is obtained when the screens are arranged under angles 20°–60° to the main direction of the stream.

It will be understood that each of the elements described above, or two or more together, may also find a useful application in other types of methods and constructions differing from the types described above.

While the invention has been illustrated and described as embodied in a method of and apparatus for cooling food products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of cooling food products, comprising the steps of providing a container for accommodating food products; supplying a liquid carbon dioxide and discharging it in an interior of said container so as to form snow in the container, with simultaneous generation of carbon dioxide vapors; and moving the carbon dioxide vapors relative to the supplied liquid carbon dioxide in the container so that cold of the carbon dioxide vapors is transferred to the supplied liquid carbon dioxide in the container.

2. A method as defined in claim 1; and further comprising the step of withdrawing liquid carbon dioxide vapors from the container, liquefying the withdrawn carbon dioxide vapors and supplying the liquefied carbon dioxide vapors into the liquid carbon dioxide.

3. A method as defined in claim 1, wherein said step of supplying includes supplying a liquid carbon dioxide into the container through an exterior supply line leading from a source of liquid carbon dioxide to an inlet opening of the container, said step of moving includes moving carbon dioxide vapors relative to the exterior supply line so as to cool liquid carbon dioxide supplied in the exterior supply line.

4. A method as defined in claim 1, wherein said step of supplying includes supplying liquid carbon dioxide through an inlet opening of the container, said moving including moving carbon dioxide vapors in the area of the inlet opening of the container so as to transfer cold of carbon dioxide vapors to liquid carbon dioxide in the area of the inlet opening.

5. A method as defined in claim 1, wherein said step of supplying includes supplying liquid carbon dioxide near at least one of walls of the container, said moving includes moving carbon dioxide vapors near the at least one wall so that cold from carbon dioxide vapor is transferred to liquid carbon dioxide in the area of the at least one wall.

6. A method as defined in claim 1, wherein said container has a floor provided with a plurality of separate floor elements having a plurality of internal channels, said supplying includes supplying liquid carbon dioxide through the internal channels of the floor elements, said moving includes moving carbon dioxide vapors between the elements of the floor so as to transfer cold of carbon dioxide vapors to liquid carbon dioxide supplied through the openings of the floor elements.

7. A method as defined in claim 1, wherein said step of supplying includes supplying liquid carbon dioxide through a plurality of elements from one end to another end so that a distance between the elements at the one end is smaller than the distance between the elements at the other end.

8. A method as defined in claim 1; and further comprising the step of separating carbon dioxide snow produced in the interior of the container from carbon dioxide vapors and sublimating the separate carbon dioxide snow.

9. An apparatus for cooling food products, comprising a container for accommodating cooled products; means for supplying liquid carbon dioxide into said container; means for discharging liquid carbon dioxide in said container so as to produce carbon dioxide snow with simultaneous generation of carbon dioxide vapors; and means for moving carbon dioxide vapors in the vicinity of said supplying means in said container so that cold of carbon dioxide vapors is transferred to the supplied liquid carbon dioxide in said container.

10. An apparatus as defined in claim 9; and further comprising means for withdrawing carbon dioxide vapors from the container, liquefying the withdrawn Carbon dioxide vapors and introducing the liquefied carbon dioxide vapor into said supplying means of liquid carbon dioxide.

11. An apparatus as defined in claim 9, wherein said supplying means include a source of liquid carbon dioxide, and an exterior supply line extending from said source to said container, said moving means being arranged so that carbon dioxide vapors move near said exterior supply line so as to transfer cold of carbon dioxide vapors to liquid carbon dioxide in said exterior supply line.

12. An apparatus as defined in claim 9, wherein said container has an inlet opening through which said supply means introduce liquid carbon dioxide into the interior of the container, said moving means being formed so that carbon dioxide vapors move in the said inlet opening so that cold of carbon dioxide vapors is transferred to liquid carbon dioxide in said inlet opening of said container.

13. An apparatus as defined in claim 9, wherein said container has a plurality of walls, said supplying means being formed so that liquid carbon dioxide is moved in the vicinity of at least one of said walls, said moving means being formed so that carbon dioxide vapors move in the vicinity of said at least one wall so that cold of carbon dioxide vapors is transferred to liquid carbon dioxide in the vicinity of said at least one wall.

14. An apparatus as defined in claim 9, wherein said containers has a floor including a plurality of floor elements which are spaced from one another and provided with channels, said supplying means being arranged so that liquid carbon dioxide is supplied through said channels of said floor elements, said moving means being formed so that carbon dioxide vapors move between said floor elements so that cold of carbon dioxide vapors is transferred to liquid carbon dioxide through said floor elements.

15. An apparatus as defined in claim 9, wherein said supplying means include a plurality of pipes which form panels arranged so that said panels are spaced from one another by smaller distances at one end and are spaced from one another by greater distances at another end and liquid carbon dioxide flows from said one end to said another end.

16. An apparatus as defined in claim 9; and further comprising means for separating carbon dioxide snow from carbon dioxide vapors during movement of carbon dioxide vapors and further sublimating the separated carbon dioxide snow.

17. An apparatus for cooling food products, comprising a container for accommodating cooled products; means for supplying liquid carbon dioxide into said container; means for discharging liquid carbon dioxide in said container so as to produce carbon dioxide snow to cover the food products with simultaneous generation of carbon dioxide vapors; and means for moving carbon dioxide vapors in the vicinity of said supply means in said container so that cold of carbon dioxide vapors is transferred to the supplied liquid carbon dioxide in said container; and means for separating carbon dioxide snow from carbon dioxide vapors during movement of carbon dioxide vapors and further sublimating the separated carbon dioxide snow, said supplying means including tubular means for supplying liquid carbon dioxide inside said tubular means, said separating means include net-like means arranged on said tubular means and formed so that carbon dioxide vapors can pass through said net-like means while carbon dioxide snow is retained by said net-like means and be sublimated by the supplied liquid carbon dioxide.

* * * * *